United States Patent
Yudanov et al.

(10) Patent No.: US 11,836,610 B2
(45) Date of Patent: Dec. 5, 2023

(54) CONCURRENT TRAINING OF FUNCTIONAL SUBNETWORKS OF A NEURAL NETWORK

(71) Applicant: ADVANCED MICRO DEVICES, INC., Santa Clara, CA (US)

(72) Inventors: Dmitri Yudanov, Austin, TX (US); Nicholas Penha Malaya, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1438 days.

(21) Appl. No.: 15/841,030

(22) Filed: Dec. 13, 2017

(65) Prior Publication Data
US 2019/0180176 A1   Jun. 13, 2019

(51) Int. Cl.
*G06N 3/08* (2023.01)
*G06N 3/045* (2023.01)

(52) U.S. Cl.
CPC ............ *G06N 3/08* (2013.01); *G06N 3/045* (2023.01)

(58) Field of Classification Search
CPC ........ G06N 3/08; G06N 3/0454; G06N 3/084; G06N 3/045
See application file for complete search history.

(56) References Cited

U.S. PATENT DOCUMENTS

| 5,517,598 A | 5/1996 | Sirat |
| 6,269,351 B1 | 7/2001 | Black |
| 6,587,845 B1 * | 7/2003 | Braunheim ............ G16C 20/70 706/21 |
| 9,224,068 B1 * | 12/2015 | Ranzato ............... G06K 9/6255 |
| 9,858,524 B2 * | 1/2018 | Bengio ................ G06N 3/0454 |
| 10,824,940 B1 * | 11/2020 | Rybakov ................. G06N 3/08 |

(Continued)

FOREIGN PATENT DOCUMENTS

| JP | H06-309293 | 11/1994 |
| JP | 2014-229124 | 12/2012 |
| WO | 2016189675 | 12/2016 |

OTHER PUBLICATIONS

Corlina-Morles, E. et al. (1994). "On-Line Neural Network Control Applications". IEEE. 1994. pp. 2494-2499. (Year: 1994).*

(Continued)

*Primary Examiner* — Brent Johnston Hoover (57) ABSTRACT

An artificial neural network that includes first subnetworks to implement known functions and second subnetworks to implement unknown functions is trained. The first subnetworks are trained separately and in parallel on corresponding known training datasets to determine first parameter values that define the first subnetworks. The first subnetworks are executing on a plurality of processing elements in a processing system. Input values from a network training data set are provided to the artificial neural network including the trained first subnetworks. Error values are generated by comparing output values produced by the artificial neural network to labeled output values of the network training data set. The second subnetworks are trained by back propagating the error values to modify second parameter values that define the second subnetworks without modifying the first parameter values. The first and second parameter values are stored in a storage component.

19 Claims, 8 Drawing Sheets

(56) References Cited

U.S. PATENT DOCUMENTS

| | | | |
|---|---|---|---|
| 2009/0132449 A1 | 5/2009 | Nagashima | |
| 2015/0294219 A1* | 10/2015 | Krizhevsky | G06N 3/084 706/25 |
| 2016/0110642 A1* | 4/2016 | Matsuda | G06N 3/04 706/25 |
| 2016/0162800 A1* | 6/2016 | Qin | G06N 20/00 706/12 |
| 2017/0032222 A1 | 2/2017 | Sharma et al. | |
| 2017/0039456 A1 | 2/2017 | Saberian et al. | |
| 2017/0286809 A1* | 10/2017 | Pankanti | G06T 7/30 |
| 2019/0102701 A1* | 4/2019 | Singaraju | G10L 15/063 |

OTHER PUBLICATIONS

Ge, S.S. et al. (2003). "Adaptive neural network control of nonlinear systems with unknown time delays". IEEE Transactions on Automatic Control (vol. 48, Issue: 11). DOI: 10.1109/TAC.2003.819287 (Year: 2003).*

Yu, S. et al. (2004). "A fuzzy neural network approximator with fast terminal sliding mode and its applications". Fuzzy Sets and Systems 148. pp. 469-486. doi:10.1016/j.fss.2003.12.004 (Year: 2004).*

Hayashi, Y. et al. (2012). "On General Regression Neural Network in a Nonstationary Environment". PPAM 2011, Part I, LNCS 7203, pp. 461-469. (Year: 2012).*

Krizhevsky, Alex, "One Weird Trick for Parallelizing Convolutional Neural Networks". Website https://arxiv.org/abs/1404.5997, Apr. 26, 2014, 7 pages.

McMahan, Brendan H., et al., "Communication-Efficient Learning of Deep Networks from Decentralized Data". Website https://arxiv.org/abs/1602.05629, Feb. 28, 2017, 11 pages.

International Search Report and Written Opinion dated Jan. 14, 2019 for corresponding International Application No. PCT/US2018/052381, 9 pages.

International Preliminary Report on Patentability dated Jun. 25, 2020 for International Application No. PCT/US2018/052381, 6 pages.

Extended European Search Report dated Aug. 4, 2021 for Application No. 18888865.5, 8 pages.

Office Action dated Oct. 11, 2022 for Japanese Application No. 2020-532778, 5 pages.

Translation of First Examination Report dated Apr. 9, 2022 for Indian Patent Application No. 202017024531, 7 pages.

* cited by examiner

CONCURRENT TRAINING OF FUNCTIONAL SUBNETWORKS OF A NEURAL NETWORK

BACKGROUND

Deep neural networks (DNNs) are a class of artificial neural networks (ANNs) that are able to learn how to perform tasks such as image recognition, natural language processing, and game play. A DNN architecture includes a stack of layers that implement functions to transform an input volume (such as a digital image) into an output volume (such as labeled features detected in the digital image). For example, the layers in a DNN can be separated into convolutional layers that represent convolutional neural networks (CNNs), pooling layers, and fully connected layers. Multiple sets of convolutional, pooling, and fully connected layers can be interleaved to form a complete DNN. For example, the DNN can include a set of convolutional layers that receive input and provide output to a set of pooling layers, which provide output to another set of convolutional layers. The second set of convolutional layers provide output to another set of pooling layers, which provide output to one or more sets of fully connected layers that generate the output volume. The functions implemented by the layers in a DNN are explicit (i.e., known or predetermined) or hidden (i.e., unknown). A CNN is a deep neural network (DNN) that performs deep learning on tasks that contain multiple hidden layers. For example, a DNN that is used to implement computer vision includes explicit functions (such as orientation maps) and multiple hidden functions in the hierarchy of vision flow.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

The functions of a deep neural network (DNN) are represented by different sets of parameters for the different layers. The parameters of a convolutional layer define a set of learnable filters (or kernels) that convolve incoming data across the width and height of the input volume to produce a two-dimensional (2-D) activation map of the filter. The parameters of a pooling layer define how an input volume is partitioned into sub-regions. For example, the pooling layer can be configured to partition an input image into a set of non-overlapping rectangles and generate a maximum value for each sub-region. The parameters of a fully connected layer define the high-level reasoning performed by the DNN based on connections to activations in the previous layer, such as a previous pooling layer. The parameters of the DNN are determined by training the DNN using a training data set that includes a set of input volumes and a corresponding set of (known or labeled) output values. For example, a facial recognition DNN can be trained using images that are known to include the individuals that are to be identified in other images by the facial recognition DNN. The training images are referred to as labeled data, which is defined as a group of samples that have been tagged with one or more labels. During training, the input data from the training data set is sequentially provided to the DNN and errors between the output values generated by the DNN and the known output values are accumulated. The accumulated errors are back propagated to modify parameters of the DNN. The process is repeated until a convergence criterion is satisfied. However, training a large DNN is a computationally intensive task that can require hours, days, or even months depending on the size of the network.

Training an artificial neural network is typically a sequential process. Backpropagated errors are used to modify the parameters that define the artificial neural network. Examples of the trained parameters include the connection weights for connections between nodes in the network. The accuracy of the functions implemented by the artificial neural network (e.g., pattern recognition) increases with each iteration of the sequential process as the parameters are modified based on the back propagated errors generated by each consecutive sample from the training set. Thus, it is difficult to parallelize the training process by subdividing the training data set and training multiple instances of the network in parallel because each instance of the network would only be trained based on a portion of the training set. Consequently, merging instances of a network that were trained in parallel using subsets of the training data set into a single trained network may not result in a network that performs its function with the accuracy of a network that is sequentially trained using the full training dataset.

These drawbacks in the conventional sequential training process are addressed by parallelizing the training of an artificial neural network (such as a CNN or a DNN) that includes first subnetworks that implement known functions (and which can therefore be trained using corresponding known training datasets) and second subnetworks that implement unknown functions that do not have corresponding training datasets. The first subnetworks are trained separately and in parallel on the known training datasets. The artificial neural network, including the first and second subnetworks, is then trained on a network training dataset by providing input values from the network training dataset to the artificial neural network and accumulating errors that represent a difference between the output values of the artificial neural network and labeled output values from the network training dataset. The accumulated errors are back propagated to modify parameters of the second subnetworks. Previously trained parameters of the first subnetworks are not modified during training of the artificial neural network. This process is iterated until convergence criteria for the parameters of the second subnetworks are satisfied. The first and second subnetworks are significantly smaller than the artificial neural network and, consequently, training the first and second subnetworks separately is significantly faster than training the artificial neural network.

A quality assurance step is performed to train the parameters of the artificial neural network given the parameter values determined for the trained first and second subnetworks. During the quality assurance step, input values of the training data set are provided to an instance of the artificial neural network that is defined by the modified parameters of the first and second subnetworks. Error values generated by the artificial neural network are back propagated to modify the parameters that define the first and second subnetworks in the artificial neural network and the process is iterated until a convergence criterion is satisfied. Beginning the quality assurance step using the parameter values determined for the separately trained first and second subnetworks is expected to accelerate the convergence properties of the quality assurance step (relative to the technique of training the entire artificial neural network using back propagation) because the parameter values of the trained first and second subnetworks are expected to be significantly closer to the converged values of the complete neural network than other possible initial values of the parameters, such as arbitrary or randomly chosen parameter values.

Figure 1:
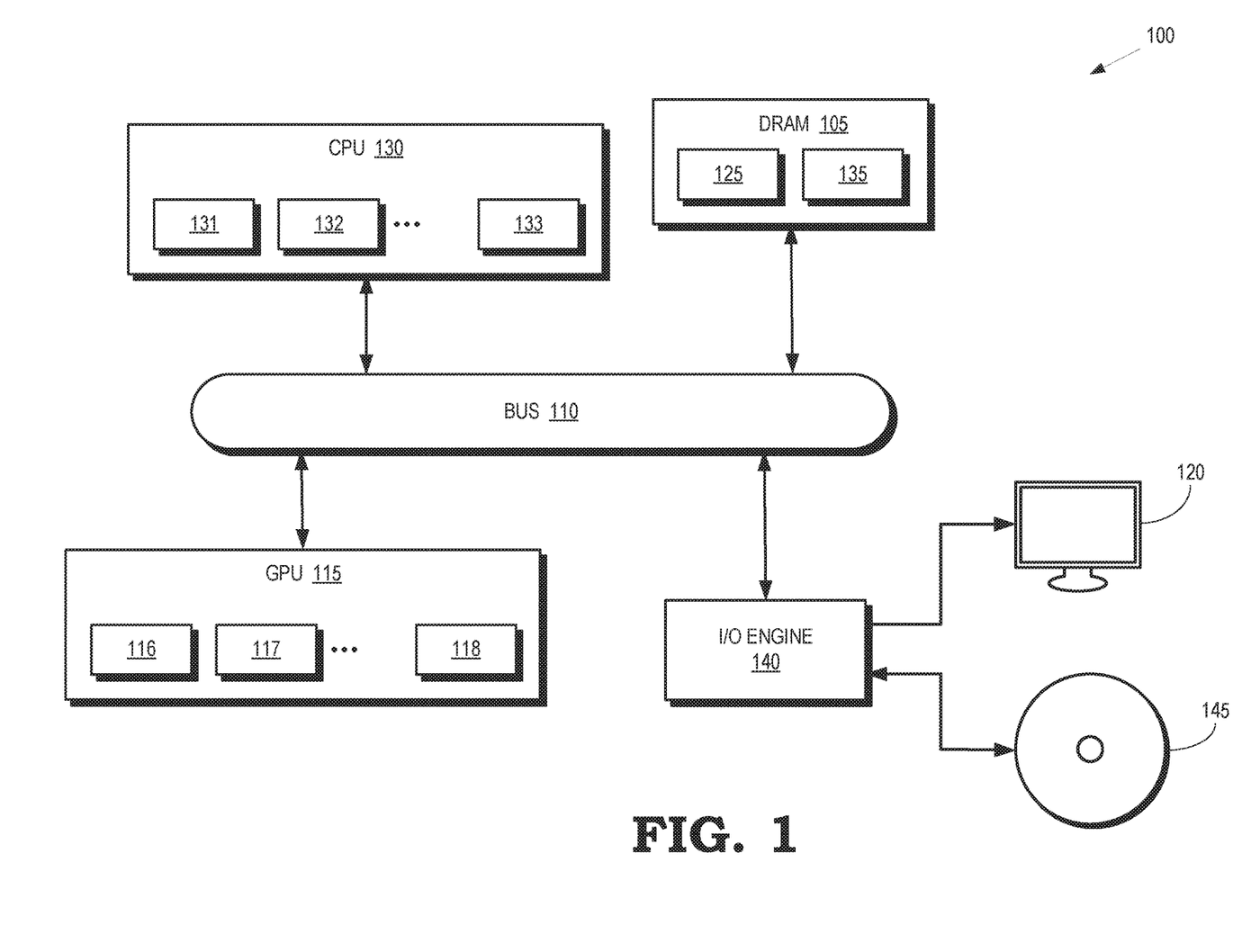
FIG. 1 is a block diagram of a processing system according to some embodiments.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 can also be used for general purpose computing. In the illustrated embodiment, the GPU 115 implements multiple processing elements 116, 117, 118 (collectively referred to herein as "the processing elements 116-118") that are configured to execute instructions concurrently or in parallel. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 125 of instructions from a program code that is to be executed by the GPU 115.

The processing system 100 also includes a central processing unit (CPU) 130 that implements multiple processing elements 131, 132, 133, which are collectively referred to herein as "the processing elements 131-133." The processing elements 131-133 are configured to execute instructions concurrently or in parallel. The CPU 130 is connected to the bus 110 and can therefore communicate with the GPU 115 and the memory 105 via the bus 110. The CPU 130 can execute instructions such as program code 135 stored in the memory 105 and the CPU 130 can store information in the memory 105 such as the results of the executed instructions. The CPU 130 is also able to initiate graphics processing by issuing draw calls to the GPU 115.

An input/output (I/O) engine 140 handles input or output operations associated with the display 120, as well as other elements of the processing system 100 such as keyboards, mice, printers, external disks, and the like. The I/O engine 140 is coupled to the bus 110 so that the I/O engine 140 is able to communicate with the memory 105, the GPU 115, or the CPU 130. In the illustrated embodiment, the I/O engine 140 is configured to read information stored on an external storage component 145, which is implemented using a non-transitory computer readable medium such as a compact disk (CD), a digital video disc (DVD), and the like. The I/O engine 140 can also write information to the external storage component 145, such as the results of processing by the GPU 115 or the CPU 130.

Artificial neural networks, such as a CNN or DNN, are represented as program code that is configured using a corresponding set of parameters. The artificial neural network can therefore be executed on the GPU 115 or the CPU 130, or other processing units including field programmable gate arrays (FPGA), application-specific integrated circuits (ASIC), processing in memory (PIM), and the like. If the artificial neural network implements a known function that can be trained using a corresponding known dataset, the artificial neural network is trained (i.e., the values of the parameters that define the artificial neural network are established) by providing input values of the known training data set to the artificial neural network executing on the GPU 115 or the CPU 130 and then comparing the output values of the artificial neural network to labeled output values in the known training data set. Error values are determined based on the comparison and back propagated to modify the values of the parameters that define the artificial neural network. This process is iterated until the values of the parameters satisfy a convergence criterion.

However, as discussed herein, artificial neural networks are often composed of subnetworks that perform known (or explicit) functions and subnetworks that perform unknown (or implicit) functions. Sequentially training the artificial neural network that includes subnetworks to implement known and unknown functions on a network training data set is a time and resource intensive process. To reduce the time and resources consumed by training an artificial network, the artificial neural network is subdivided into first subnetworks that perform known functions (which have corresponding known training datasets) and second subnetworks that perform unknown functions and therefore do not have known training datasets. The first subnetworks are trained separately and in parallel on the basis of the corresponding known training datasets. For example, separate instances of first subnetworks are executed concurrently on the processing elements 116-118 in the GPU 115 or the processing elements 131-133 in the CPU 130 or a combination drawn from all of the processing elements 116-118, 131-133. In some embodiments, multiple instances of a single first subnetwork can be trained concurrently on the processing elements and then the best-trained instance is selected for integration into the artificial neural network. Separate instances of the first subnetworks can also be trained for different variations of the known function.

Once the first subnetworks have been trained, the artificial neural network is trained on a network training data set. The parameters of the first subnetworks are held constant at this stage of the training because the parameters are expected to be accurately defined by training the first subnetworks on the basis of the known datasets. Input values from the network training datasets are provided to the artificial neural network, which is executing on one, some or all of the processing elements 116-118, 131-133. Error values are generated by comparing the output values of the artificial neural network to labeled output values from the network training data set. The error values are back propagated and used to modify the parameters of the second subnetworks. This process is iterated until the values of the parameters that define the second subnetworks satisfy convergence criteria. For example, the values of the parameters that define second subnetworks converge when a measure of the changes in the values of the parameters between two iterations falls below a threshold. The converged values of the parameters that define the artificial neural network (e.g., the parameters that define the first and second subnetworks) are then stored in a non-transitory computer readable media such as the memory 105 or the external storage component 145. In some embodiments, the stored values of the parameters for first and second subnetworks are subsequently read from the non-transitory computer readable media and used to construct other neural networks, potentially in combination with other subnetworks that may or may not be trained.

Once the values of the parameters that define the first and second subnetworks have been determined, a quality assurance step is performed on the complete artificial neural network. An instance of the artificial neural network is executed in the GPU 115 or the CPU 130. The instance is defined by integrating the first and second subnetworks into the complete artificial neural network. Input values are provided to the instance of the artificial neural network, which generates corresponding output values based on the current values of the parameters that define the artificial neural network. Error values are determined by comparing the output values to labeled output values of the training data set. The error values are back propagated and used to modify the values of the parameters that define the first and second subnetworks in the artificial neural network. This process is iterated until the values of the parameters that define the artificial neural network satisfy a convergence criterion. The artificial neural network is then considered to be trained to perform its assigned task. In some embodiments, concurrent training of the first subnetworks, training of the unknown functions in the second subnetworks, and the subsequent quality assurance training of the artificial neural network is iterated one or more times to train the artificial neural network.

Figure 2:
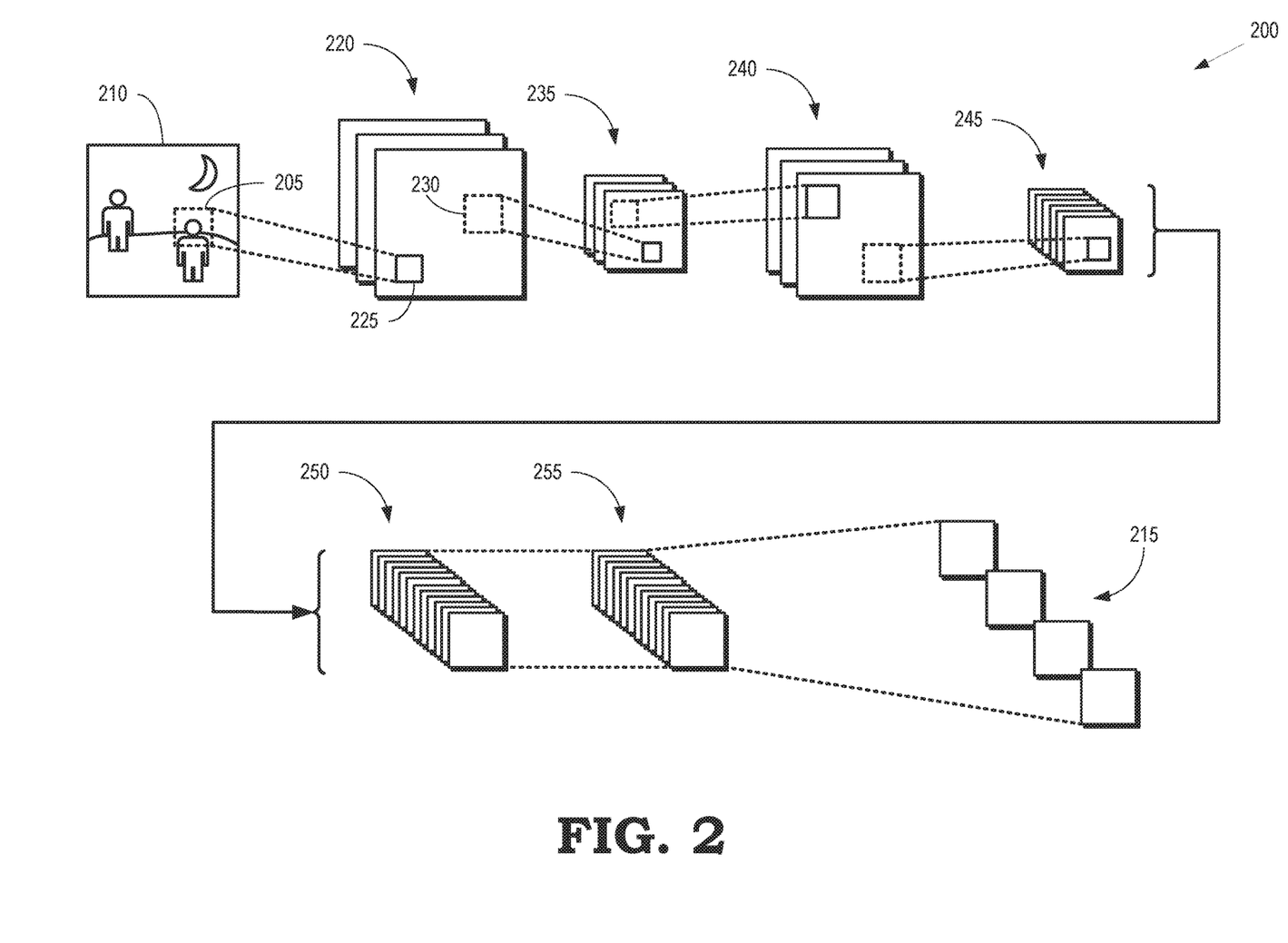
FIG. 2 is a block diagram that illustrates a deep neural network (DNN) that includes convolutional layers and is trained to perform a task such as image recognition according to some embodiments.

FIG. 2 is a block diagram that illustrates a deep neural network (DNN) 200 that is trained to perform a task such as image recognition according to some embodiments. The DNN 200 is executed on the processing elements 116-118 in the GPU 115 or the processing elements 131-133 in the CPU 130 shown in FIG. 1. The DNN 200 is configured to receive input values such as a portion 205 of an image 210 and produce output values 215 on the basis of functions implemented in the DNN 200 and values of parameters that define the functions.

The DNN 200 includes convolutional layers 220 that implement a convolutional function that is defined by a set of parameters, which are trained on the basis of one or more training datasets. The parameters include a set of learnable filters (or kernels) that have a small receptive field and extend through a full depth of an input volume of convolutional layers 220. The parameters can also include a depth parameter, a stride parameter, and a zero-padding parameter that control the size of the output volume of the convolutional layers 220. The convolutional layers 220 apply a convolution operation to input values and provide the results of the convolution operation to a subsequent layer in the DNN 200. For example, the portion 205 of the image 210 is provided as input 225 to the convolutional layers 220, which apply the convolution operation to the input 225 on the basis of the set of parameters to generate a corresponding output value 230. In some embodiments, the convolutional layers 220 are identified as a subnetwork of the DNN 200. The subnetwork then represents a convolutional neural network (CNN). However, the convolutional layers 220 can be a part of a larger subnetwork of the DNN 200 or the convolutional layers 220 can be further subdivided into multiple subnetworks of the DNN 200.

Results generated by the convolutional layers 220 are provided to pooling layers 235 in the DNN 200. The pooling layers 235 combine outputs of neuron clusters at the convolutional layers 220 into a smaller number of neuron clusters that are output from the pooling layers 235. The pooling layers 235 typically implement known (or explicit) functions. For example, pooling layers 235 that implement maximum pooling can assign a maximum value of values of neurons in a cluster that is output from the convolutional layers 220 to a single neuron that is output from the pooling layers 235. For another example, pooling layers 235 that implement average pooling can assign an average value of the values of the neurons in the cluster that is output from the convolutional layers 220 to a single neuron that is output from the pooling layers 235. The known (or explicit) functionality of the pooling layers 235 can therefore be trained using predetermined training datasets. In some embodiments, the pooling layers 235 are identified as a subnetwork of the DNN 200. However, the pooling layers 235 can be a part of a larger subnetwork of the DNN 200 or the pooling layers 235 can be further subdivided into multiple subnetworks of the DNN 200.

In the illustrated embodiment, the DNN 200 also includes additional convolutional layers 240 that receive input from the pooling layers 235 and additional pooling layers 245 that receive input from the additional convolutional layers 240. However, the additional convolutional layers 240 and the additional pooling layers 245 are optional and are not present in some embodiments of the DNN 200. Furthermore, some embodiments of the DNN 200 can include larger numbers of convolutional and pooling layers. The additional convolutional layers 240 and the additional pooling layers 245 can be identified as subnetworks of the DNN 200, portions of subnetworks of the DNN 200, or they can be subdivided into multiple subnetworks of the DNN 200.

Output from the additional pooling layers 245 are provided to fully connected layers 250, 255. The neurons in the fully connected layers 250, 255 are connected to every neuron in another layer, such as the additional pooling layers 245 or the other fully connected layers. The fully connected layers 250, 255 typically implement functionality that represents the high-level reasoning that produces the output values 215. For example, if the DNN 200 is trained to perform image recognition, the fully connected layers 250, 255 implement the functionality that labels portions of the image that have been "recognized" by the DNN 200. Examples of labels include names of people whose faces are detected in the image 210, types of objects detected in the image, and the like. The functions implemented in the fully connected layers 250, 255 are represented by values of parameters that are determined using a training dataset, as discussed herein. The fully connected layers 250, 255 are identified as subnetworks of the DNN 200, portions of subnetworks of the DNN 200, or they are subdivided into multiple subnetworks of the DNN 200.

Figure 3:
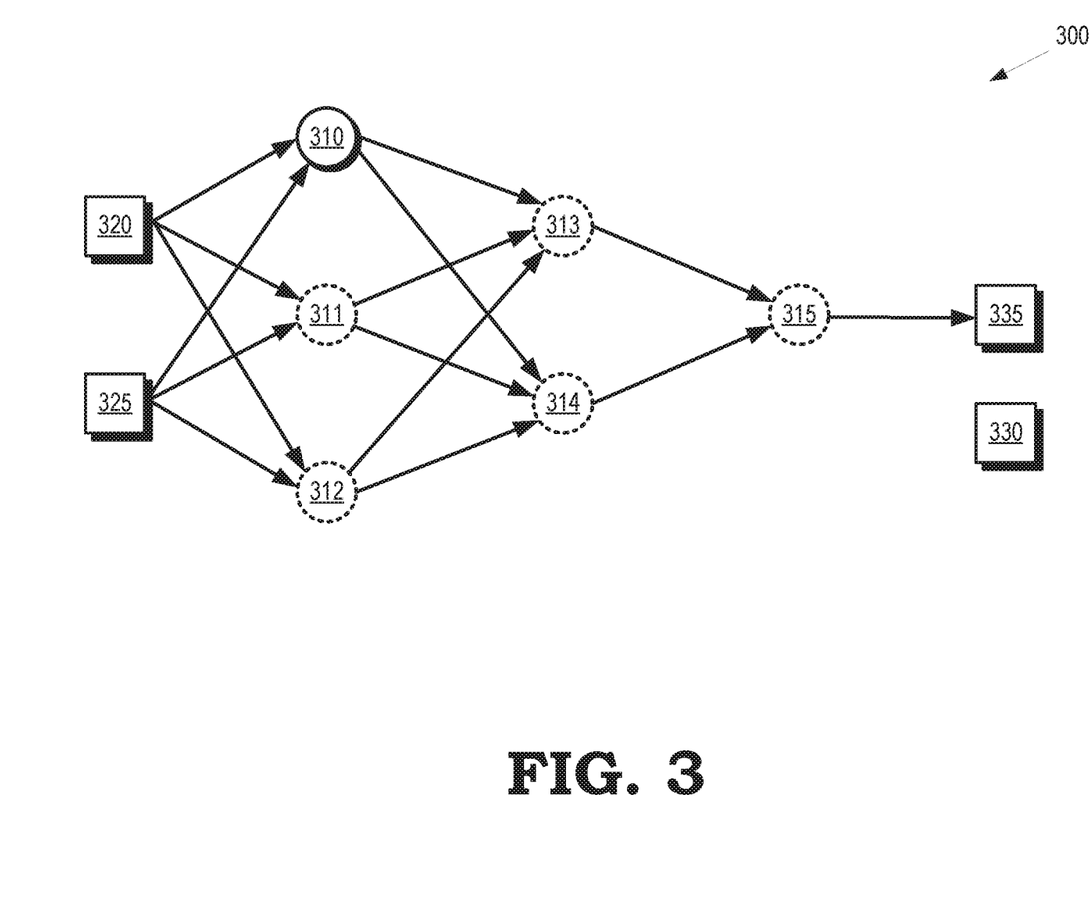
FIG. 3 is a block diagram illustrating training of subnetworks that implement unknown functions within an instance of an artificial neural network that also includes subnetworks that implement known functions according to some embodiments.

FIG. 3 is a block diagram illustrating training of subnetworks that implement unknown functions within an instance 300 of an artificial neural network that also includes subnetworks that implement known functions according to some embodiments. The instance 300 is executed on processing elements such as the processing elements 116-118, 131-133 shown in FIG. 1. The DNN is implemented using interconnected subnetworks 310, 311, 312, 313, 314, 315, which are collectively referred to herein as "the subnetworks 310-315." The subnetworks 310-315 implement different functions that are defined by values of parameters that characterize the subnetworks 310-315. In the illustrated embodiment, the subnetwork 310 implements an unknown function and consequently does not have a known training dataset. Although a single subnetwork 310 implementing an unknown function is shown in FIG. 3, some embodiments of the artificial neural network include multiple subnetworks that implement one or more unknown functions. The subnetworks 311-315 implement known functions that have corresponding known training datasets. The subnetworks 311-315 have therefore been trained separately and in parallel on the basis of the corresponding known training datasets.

The instance 300 of the DNN is trained using a network training dataset that includes the input values 320 and 325 and the labeled output values 330. The instance 300 of the DNN can receive the input values 320, 325 and generate output values 335. Error values are then determined for the instance 300 of the DNN by comparing the output values 335 to the labeled output values 330. The subnetwork 310 is identified as a training subnetwork, as indicated by the solid lines, which means that the parameters that define the subnetworks 310 are modified based on back propagated error values. The subnetworks 311-315 are identified as non-training subnetworks, as indicated by the dashed lines, which means that the parameters that define the subnetworks 311-315 are not modified based on the back propagated error values because these parameters were previously trained on the basis of known training datasets associated with the functions of the subnetworks 311-315.

The training subnetwork 310 is then trained by assuming that the error values produced by the instance 300 of the DNN are produced by inaccurate values of the parameters that define the training subnetwork 310. The values of the parameters are therefore modified based on the error values produced during a current iteration to reduce the error values produced during a subsequent iteration. The values of the parameters that define the other (non-training) subnetworks 311-315 are held constant during the training process. For example, the values of the parameters that define the subnetwork 310 in the instance 300 of the DNN are iteratively modified to reduce the error values produced by the instance 300 of the DNN, while holding the values of the parameters that define the subnetworks 311-315 constant.

Figure 4:
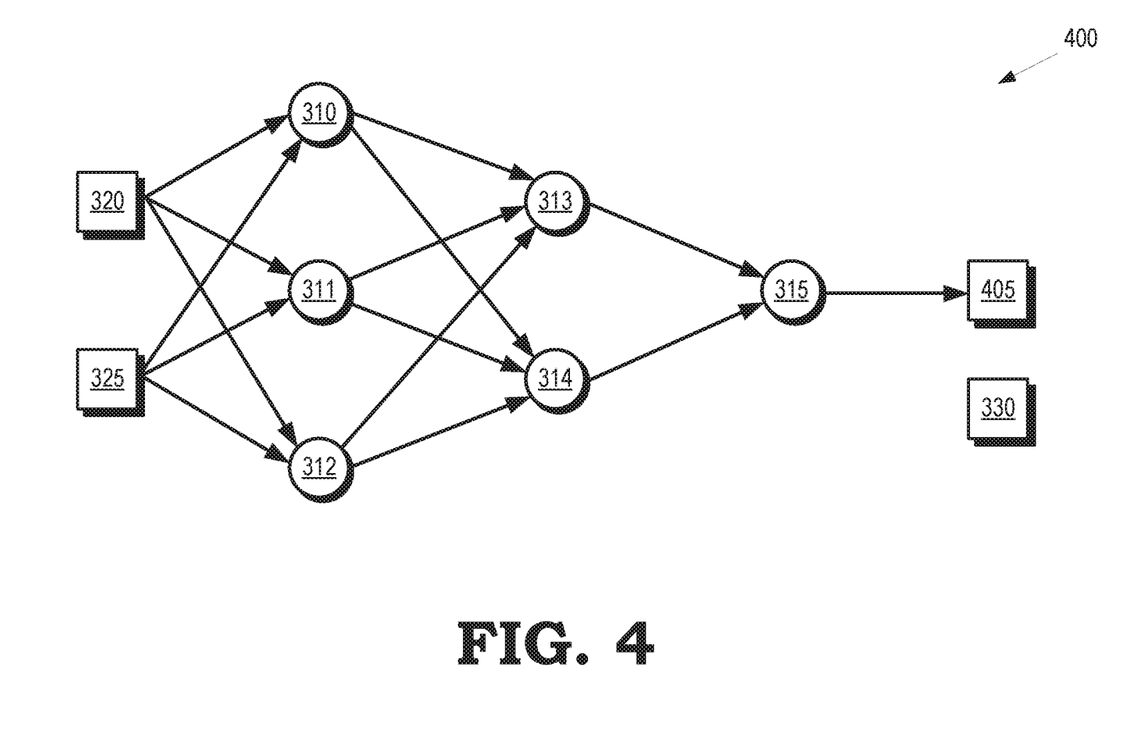
FIG. 4 is a block diagram illustrating an instance of the CNN shown in FIG. 3 that is executed to perform a quality assurance step according to some embodiments.

FIG. 4 is a block diagram illustrating an instance 400 of the DNN shown in FIG. 3 that is executed to perform a quality assurance step according to some embodiments. The instance 400 can be executed on a processing element such as one of the processing elements 116-118, 131-133 shown in FIG. 1. During the quality assurance step, all of the subnetworks 310-315 are treated as training subnetworks, as indicated by the solid lines. The complete DNN is trained on the network training dataset 320, 325, 330 using the values of the parameters that define the previously trained subnetworks 310-315 (this is e.g., as illustrated in FIG. 3) as initial values for the iterative training process. The instance 400 of the DNN receives the input values 320, 325 and produces output values 405 based on the current values of the parameters that define the DNN, e.g., the parameters that define the subnetworks 310-315. The output values 405 are compared to the labeled output values 330 to determine error values, which are back propagated and used to modify the parameter values that define the DNN. This process is iterated until a convergence criterion is satisfied, such as a measure of a rate of change of the error values or a magnitude of the error values falling below a threshold.

Training the subnetworks 311-315 that implement known functions separately and in parallel allows the subnetwork training to be performed concurrently or in parallel on different processing elements, thereby reducing the time required to train the subnetworks 311-315. The values of the parameters that define the trained subnetworks 311-315 are likely to be much closer to the values of the parameters that are determined by training the complete DNN using the input values 320, 325, 330 of the training data set, e.g., using the instance 400 shown in FIG. 4. Convergence of the training process for the complete DNN (including training the subnetworks 310-315 and performing the quality assurance step) is therefore expected to consume less time, energy and fewer resources than the conventional practice of training the complete CNN on the input values 320, 325, 330 of the training data set using arbitrary or random initial values of the parameters.

Figure 5:
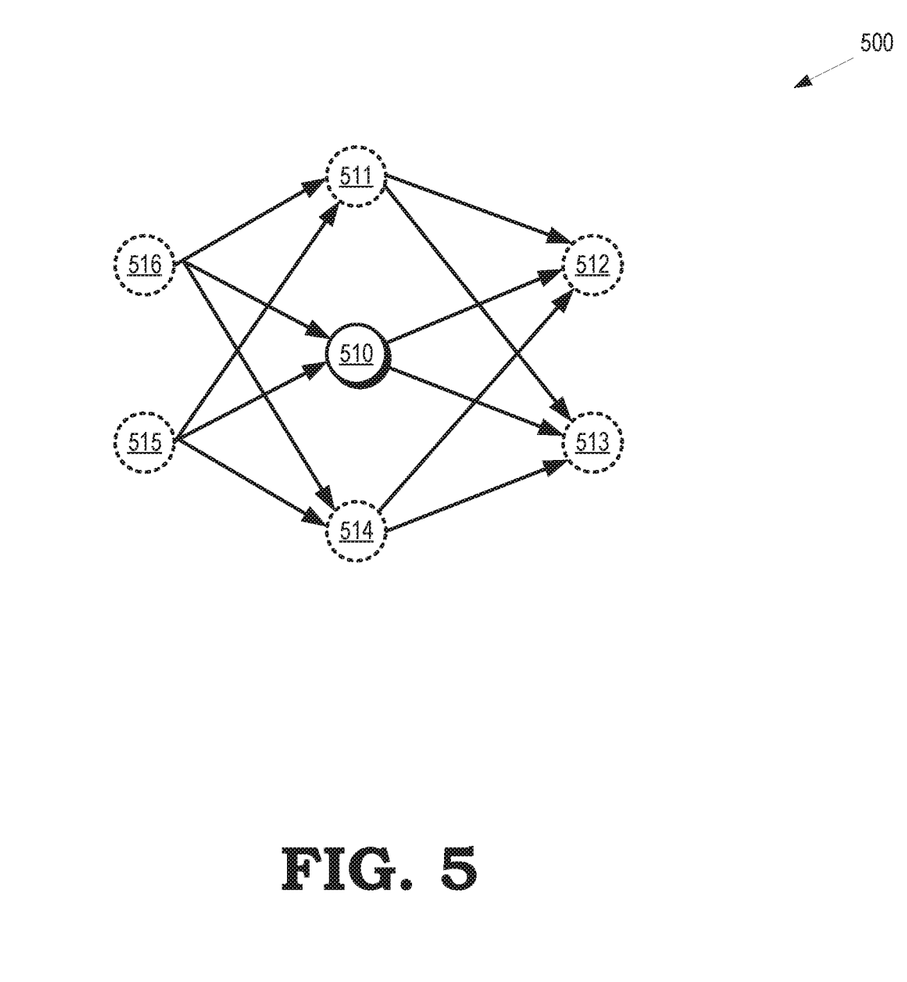
FIG. 5 is a block diagram illustrating training of subnetworks that implement unknown functions within a cutout portion of an artificial neural network that also includes subnetworks that implement known functions according to some embodiments.

FIG. 5 is a block diagram illustrating training of subnetworks that implement unknown functions within a cutout portion 500 of an artificial neural network that also includes subnetworks that implement known functions according to some embodiments. The cutout portion 500 is executed on processing elements such as the processing elements 116-118, 131-133 shown in FIG. 1. The cutout portion 500 of the artificial neural network is implemented using interconnected subnetworks 510, 511, 512, 513, 514, 515, 516, which are collectively referred to herein as "the subnetworks 510-516." The subnetworks 510-516 implement different functions that are defined by values of parameters that characterize the subnetworks 510-516. In the illustrated embodiment, the subnetwork 510 implements an unknown function and consequently does not have a known training dataset. Although a single subnetwork 510 implementing an unknown function is shown in FIG. 5, some embodiments of the artificial neural network include multiple subnetworks that implement one or more unknown functions. The subnetworks 511-516 implement known functions that have corresponding known training datasets. The subnetworks 511-516 have therefore been trained separately and in parallel on the basis of the corresponding known training datasets.

The subnetwork 510 is substantially encompassed by the subnetworks 511-516. As used herein, the phrase "substantially encompassed" indicates that the inputs to the subnetwork 510 are provided exclusively (or primarily) by one or more of the subnetworks 511-516 and none (or a small number of) outputs from the subnetwork 510 are exposed to any subnetworks except for the subnetworks 511-516. In that case, the subnetwork 510 is trained on the basis of a combined training dataset that is composed of the known training datasets for the subnetworks 511-516. For example, the subnetworks 511-516 can be trained separately and in parallel on the basis of their corresponding known training datasets, as discussed herein. The subnetwork 510 is then trained by training the cutout portion 500 on the basis of the combined training dataset, while keeping the parameters of the previously trained subnetworks 511-516 constant. Once trained, the cutout portion 500 is integrated into the complete artificial neural network, which is trained on the basis of the network training dataset as discussed herein.

Figure 6:
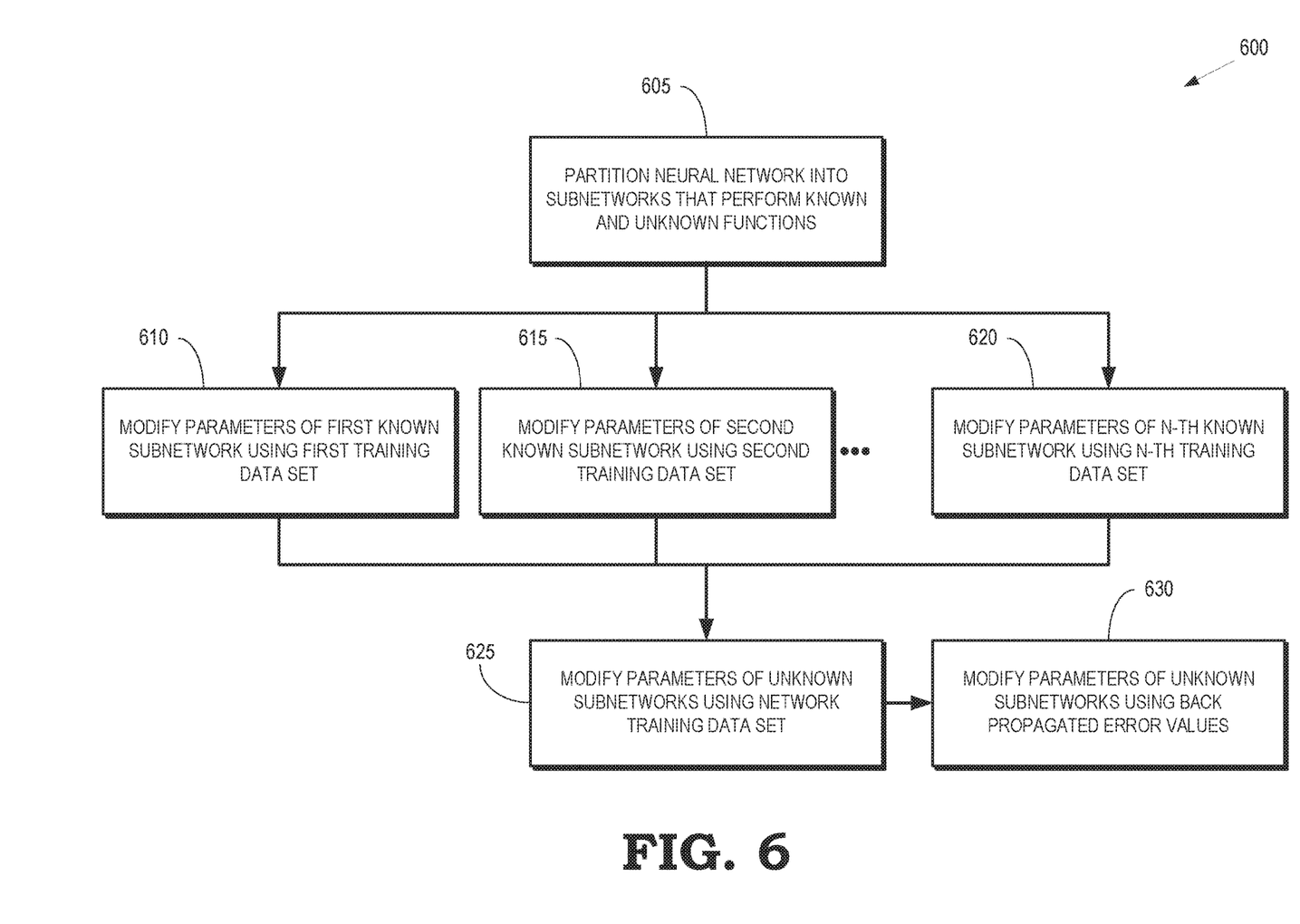
FIG. 6 is a flow diagram of a method for training an artificial neural network (such as a CNN or a DNN) that includes first subnetworks that according to some embodiments.

FIG. 6 is a flow diagram of a method 600 for training an artificial neural network (such as a CNN or a DNN) that includes first subnetworks according to some embodiments. The method 600 is implemented in some embodiments of the processing system 100 shown in FIG. 1.

At block 605, the artificial neural network is partitioned into subnetworks that perform known functions and subnetworks that perform unknown functions in the artificial neural network. The definition of function is not strict. A DNN architect can define functions based on network topology or internal primitive operation performed by a subnetwork or any other reasonable criteria. For example, an artificial neural network such as the deep neural network 200 shown in FIG. 2 that includes convolutional layers 220, pooling layers 235, convolutional layers 240, pooling layers 245, and fully connected layers 250, 255 is partitioned into a first subnetwork that includes the convolutional layers 220, a second subnetwork that includes the pooling layers 235, a third subnetwork that includes the convolutional layers 240, a fourth subnetwork that includes the pooling layers 245, a fifth subnetwork that includes the fully connected layers 250, and a sixth subnetwork that includes the fully connected layers 255. Other partitions of the neural network at higher or lower layers of granularity are also possible. For example, partitioning of the layers can occur within an individual layer such as within the convolutional layers 220.

The first subnetworks that have known functions are trained separately and in parallel on different processing elements, such as the processing elements 116-118, 131-133 shown in FIG. 1. The first subnetworks are trained on known datasets corresponding to the functions implemented in the first subnetworks. In the illustrated embodiment, the values of the parameters that define a training subnetwork are modified based on a training dataset specific to each subnetwork. This training data set is known since the function of a subnetwork (the values of outputs produced in response to the inputs) is also known. For example, at block 610, the values of the parameters that define the first known subnetwork are modified based on error values determined by comparing output values of this subnetwork to labeled output values of a training dataset for this subnetwork. At block 615, the values of the parameters that define the second known subnetwork are modified based on error values determined by comparing output values of the second subnetwork to labeled output values of the training dataset for the second known subnetwork. At block 620, the values of the parameters that define the N-th known subnetwork are modified based on error values determined by comparing output values of the N-th subnetwork to the labeled output values of the known training dataset of N-th subnetwork.

The processes represented by blocks 610, 615, 620 are performed concurrently or in parallel.

At block 625, the parameters of the second subnetworks that implement unknown functions are modified based on a network training dataset for the artificial neural network. The values of the parameters that define first subnetworks in the artificial neural network are set equal to the values of the parameters determined in blocks 610, 615, 620 so that the first subnetworks are integrated back into the overall artificial neural network. The values of the parameters that define the second subnetworks are set to random or arbitrary values or using any other criteria for setting initial values. Input values from the network training dataset are provided to the artificial neural network, which generates output values based on the current values of the parameters. The output values are compared to the labeled output values of the network training dataset to determine error values, which are back propagated to modify the values of the parameters that define the second subnetworks. The parameters that define the first subnetworks are held constant during this process, which is iterated until a convergence criterion for the second subnetworks is satisfied.

At block 630, a quality assurance step is performed. In the quality assurance step, input values from the network training dataset are provided to the artificial neural network, which generates output values based on the current values of the parameters. The output values are compared to the labeled output values of the network training dataset to determine error values. The quality assurance step performed at block 630 differs from the step performed at block 625 because the error values are back propagated to modify the values of the parameters that define both the first and second subnetworks. The quality assurance step is iterated until convergence criteria for the artificial neural network is satisfied. Once the process has converged, the values of the parameters that define the first and second subnetworks are stored in a storage component that is implemented using a non-transitory computer readable medium such as the memory 105 or the external storage component 145 shown in FIG. 1.

Figure 7:
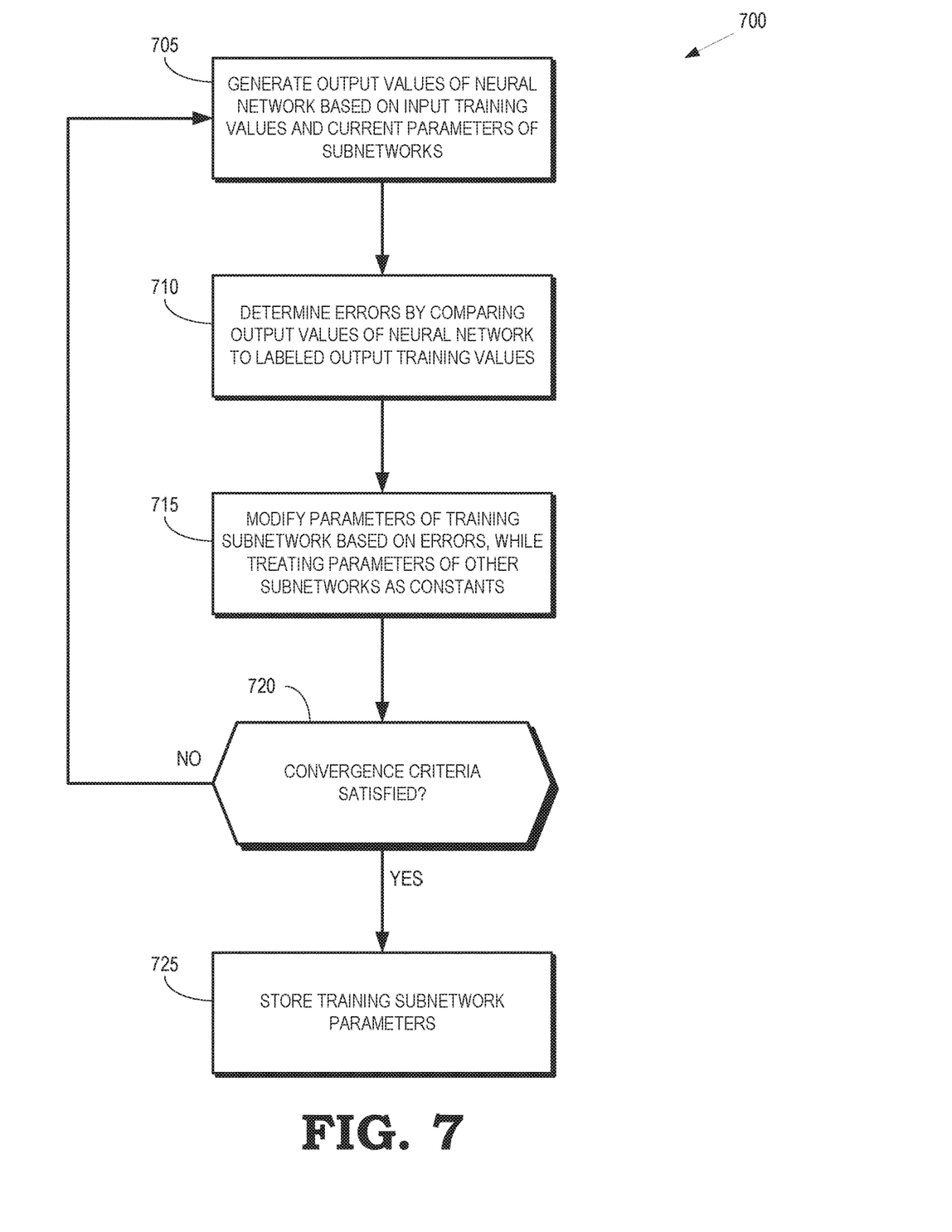
FIG. 7 is a flow diagram of a method for training subnetworks that implement unknown functions within an artificial neural network (such as a CNN or a DNN) that includes subnetworks that implement known and unknown functions according to some embodiments.

FIG. 7 is a flow diagram of a method 700 for training subnetworks that implement unknown functions within an artificial neural network (such as a CNN or a DNN) that includes subnetworks that implement known and unknown functions according to some embodiments. The method 700 is implemented in some embodiments of the processing system 100 shown in FIG. 1. The method 700 is used to implement some embodiments of the method 600 shown in FIG. 6.

At block 705, the artificial neural network generates output values based on input training values from a training dataset and current values of the parameters of the subnetworks that make up a neural network. As discussed herein, the subnetworks that implement unknown functions in the artificial neural network are identified as training subnetworks.

At block 710, output values of the artificial neural network are compared to labeled output values for the training dataset. Error values are determined based on the comparison. For example, the error values can indicate a percentage of people or objects in one or more training images that are correctly identified by the artificial neural network as indicated by the comparison of the output values to the labeled output values.

At block 715, values of the parameters that define the training subnetworks (i.e., the subnetworks that implemented unknown functions) are modified based on the error values. The values of the parameters that define the other subnetworks that implement known functions in the artificial neural network are held constant, i.e., the values of the parameters that define the training subnetwork are modified under the assumption that the error is caused by incorrect values of the parameters that define the training subnetwork only.

At decision block 720, a convergence criterion is evaluated for the values of the parameters that define the training subnetwork. For example, the values of the parameters determined in a current iteration of the method 700 can be compared to the values of the parameters determined in a previous iteration of the method 700. The values of the parameters satisfy the convergence criterion is a measure of the change in the values between the current and the previous iteration falls below a threshold. Other convergence criteria can be applied in other embodiments such as comparing the output of the network to the labeled data. In this case the test for convergence (block 720) can be placed between block 710 and 715. If the convergence criterion is not satisfied, the method 700 flows back to block 705 to begin another iteration of the method 700 using the modified values of the parameters. Modification is done by back propagation or any other method used in training neural networks. If the convergence criterion is satisfied, the method 700 flows to block 725.

At block 725, the converged values of the parameters that define the training subnetworks are stored in a storage component that is implemented using a non-transitory computer readable medium. For example, the converged values are stored in the memory 105 or the external storage component 145 shown in FIG. 1. The stored values can then be accessed for subsequent quality assurance step that is performed for the neural network. The stored values can also be accessed and combined with other parameter values for other subnetworks to form new neural networks, as discussed herein.

Figure 8:
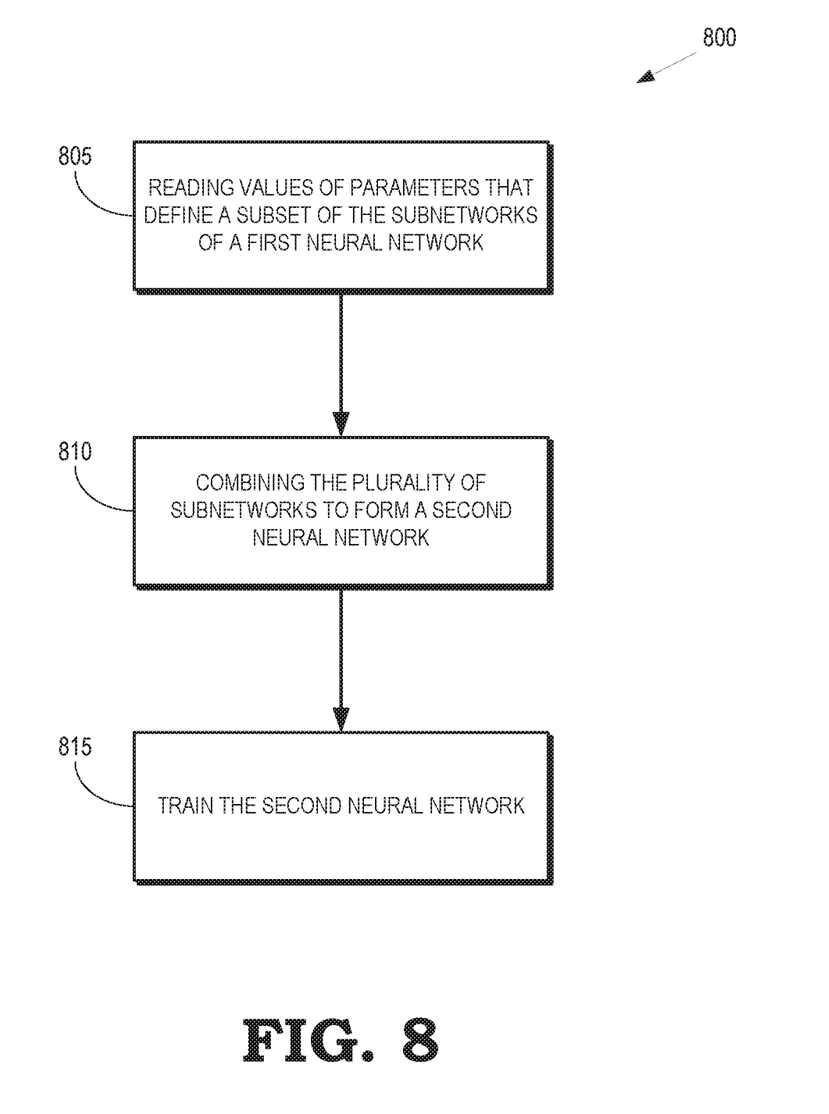
FIG. 8 is a flow diagram of a method for generating and training a neural network based on previously trained subnetworks according to some embodiments.

FIG. 8 is a flow diagram of a method 800 for generating and training a neural network based on previously trained subnetworks according to some embodiments. In the illustrated embodiment, a first neural network has been subdivided into a plurality of subnetworks and then trained using a network training dataset. For example, the first neural network can be trained according to embodiments of the method 600 shown in FIG. 6 and the method 700 shown in FIG. 7. The values of the parameters that define the subnetworks in the first neural network are stored in a non-transitory computer readable medium such as the external storage component 145 shown in FIG. 1. Training of the first neural network is performed by the processing system 100 shown in FIG. 1 or by another processing system.

At block 805, values of the parameters that define a subset of the subnetworks of the first neural network are read from the non-transitory computer readable storage medium. In some embodiments, values of parameters that define subnetworks of other neural networks are also read from the non-transitory computer readable storage medium.

At block 810, the subnetworks are combined to form a second neural network. As discussed herein, combining the subnetworks to form the second neural network includes configuring program code and parameter values to represent the second neural network, e.g. connecting outputs of a set of subnetworks to inputs of another set of subnetworks. Various criteria can be selected for integrating subnetworks from the plurality of networks into a new network, e.g., functional integration, information data streams, real-time aspects and many others. The second neural network can therefore be executed on one or more processing elements. For example, the values of the parameters that define the subset of the subnetworks of the first neural network and, if available, the values of the parameters that define the subnetworks of other neural networks are interconnected to construct the second neural network so that the second neural network can be executed on one or more processing elements such as the processing elements 116-118, 131-133 shown in FIG. 1.

At block 815, the second neural network is trained on the basis of a network training dataset. The values of the parameters that define the second neural network are initially set equal to the corresponding values of the parameters that define the subnetworks that make up the second neural network. The second neural network can then be trained using some embodiments of the method 600 shown in FIG. 6 and the method 700 shown in FIG. 7. Beginning the training process using previously trained values of the parameters that define the subnetworks can accelerate the training process so that training consumes less time and fewer resources relative to beginning the training process of the second neural network using arbitrary or random values of the parameters that define the second neural network.

In some embodiments, the apparatus and techniques described above are implemented in a system including one or more integrated circuit (IC) devices (also referred to as integrated circuit packages or microchips), such as the processing system described above with reference to FIGS. 1-7. Electronic design automation (EDA) and computer aided design (CAD) software tools may be used in the design and fabrication of these IC devices. These IC devices can implement methods described herein directly in the transistor circuitry or as programmable code executing on this circuitry.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). Subnetworks and networks described herein can be stored in such storage medium.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of training an artificial neural network that comprises first subnetworks to implement known functions and second subnetworks to implement unknown functions, the method comprising:
   training the first subnetworks separately and in parallel on corresponding known training data sets by executing separate instances of the first subnetworks concurrently on processing elements of a processor to determine first parameter values that define the first subnetworks;
   providing input values from a network training data set to the artificial neural network including the trained first subnetworks;
   generating error values by comparing output values produced by the artificial neural network to labeled output values of the network training data set;
   using the error values to modify second parameter values that define the second subnetworks without modifying the first parameter values; and
   storing the first and second parameter values,
   wherein, after training of the artificial neural network is completed, the second subnetworks are substantially encompassed by the first subnetworks such that inputs to the second subnetworks are provided by the first subnetworks and outputs from the second subnetworks are provided to the first subnetworks.

2. The method of claim 1, wherein training the first subnetworks comprises concurrently providing input values of the corresponding known training data sets to the first subnetworks, concurrently generating error values for the first subnetworks, and concurrently modifying the first parameter values.

3. The method of claim 2, wherein concurrently providing the input values of the corresponding known training data sets to first subnetworks, concurrently generating the error values for the first subnetworks, and concurrently modifying the first parameter values that define the first subnetworks are performed iteratively until convergence criteria for the first parameter values are satisfied.

4. The method of claim 3, further comprising:
   training a second subnetwork based on a cutout training set formed of a subset of known training data sets corresponding to a first subset of the first subnetworks, wherein the first subset encompasses the second subnetwork.

5. The method of claim 1, further comprising:
   providing the input values of the network training data set to an instance of the artificial neural network that is defined by the parameter values of the first and second subnetworks;
   generating error values by comparing output values from the artificial neural network to labeled values in the network training data set;
   using error values to modify the first and second parameter values that define the first and second subnetworks; and
   storing the modified parameter values that define the first and second subnetworks.

6. The method of claim 1, further comprising:
   reading stored parameter values for a subset of the first subnetworks of the artificial neural network; and
   defining parameter values of a different artificial neural network using the stored parameter values for the subset of the first subnetworks of the artificial neural network.

7. The method of claim 1, wherein training the first subnetworks separately and in parallel comprises training each respective one of the first subnetworks based on error values determined by comparing output values of each respective one of the first subnetworks to labeled output values of a training data set for each respective one of the first subnetworks, such that each respective one of the first subnetworks is trained without reference to any output values of any others of the first subnetworks.

8. The method of claim 1, wherein the second subnetworks do not have known training data sets.

9. The method of claim 1, wherein the second subnetworks are substantially encompassed by the first subnetworks such that inputs to the second subnetworks are provided exclusively by the first subnetworks and outputs from the second subnetworks are provided exclusively to the first subnetworks.

10. A processing system comprising:
    a plurality of processing circuits configured to train an artificial neural network that comprises first subnetworks to implement known functions and second subnetworks to implement unknown functions, wherein, after training of the artificial neural network, the second subnetworks are substantially encompassed by the first subnetworks such that inputs to the second subnetworks are provided by the first subnetworks and outputs from the second subnetworks are provided to the first subnetworks, by:

training the first subnetworks separately and in parallel on corresponding known training data sets by executing separate instances of the first subnetworks concurrently on processing elements of a processor to determine first parameter values that define the first subnetworks;

providing input values from a network training data set to the artificial neural network including the trained first subnetworks;

generating error values by comparing output values produced by the artificial neural network to labeled output values of the network training data set;

training the second subnetworks by using the error values to modify second parameter values that define the second subnetworks without modifying the first parameter values; and an input/output circuit configured to store the first and second parameter values in a storage component.

11. The processing system of claim 10, wherein the plurality of processing circuits is configured to concurrently provide input values of the corresponding known training data sets to the first subnetworks, concurrently generate error values for the first subnetworks, and concurrently modify the first parameter values.

12. The processing system of claim 11, wherein the plurality of processing circuits is configured to concurrently provide the input values of the corresponding known training data sets to first subnetworks, concurrently generate the error values for the first subnetworks, and concurrently modify the first parameter values that define the first subnetworks iteratively until convergence criteria for the first parameter values are satisfied.

13. The processing system of claim 12, wherein the plurality of processing circuits is configured to:

train a second subnetwork based on a cutout training set formed of a subset of known training data sets corresponding to a first subset of the first subnetworks, wherein the first subset encompasses the second subnetwork.

14. The processing system of claim 10, wherein the plurality of processing circuits is configured to:

provide the input values of the network training data set to an instance of the artificial neural network that is defined by the first and second parameter values of the first and second subnetworks;

generate error values by comparing output values from the artificial neural network to labeled values in the network training data set; and use the error values to modify the first and second parameter values that define the first and second subnetworks, and wherein the input/output circuit is configured to store the modified parameter values that define the first and second subnetworks in the storage component.

15. The processing system of claim 10, wherein:

the input/output circuit is configured to read parameter values for a subset of the first subnetworks of the artificial neural network from the storage component; and at least one of the plurality of processing circuits is configured to define parameter values of a different artificial neural network using the parameter values for the subset of the first subnetworks of the artificial neural network.

16. A non-transitory computer readable medium embodying a set of executable instructions, the set of executable instructions to manipulate at least one processor to train an artificial neural network that comprises first subnetworks to implement known functions and second subnetworks to implement unknown functions, wherein the instructions manipulate the processor to:

train the first subnetworks separately and in parallel on corresponding known training data sets by executing separate instances of the first subnetworks concurrently on processing elements of a processor to determine first parameter values that define the first subnetworks;

provide input values from a network training data set to the artificial neural network including the trained first subnetworks;

generate error values by comparing output values produced by the artificial neural network to labeled output values of the network training data set;

use the error values to modify second parameter values that define the second subnetworks without modifying the first parameter values; and store the first and second parameter values, wherein, after training of the artificial neural network is completed, the second subnetworks are substantially encompassed by the first subnetworks such that inputs to the second subnetworks are provided by the first subnetworks and outputs from the second subnetworks are provided to the first subnetworks.

17. The computer readable medium of claim 16, wherein the instructions to train the first subnetworks include instructions to concurrently provide input values of the corresponding known training data sets to the first subnetworks, concurrently generate error values for the first subnetworks, and concurrently modify the first parameter values.

18. The computer readable medium of claim 17, wherein the instructions to concurrently provide the input values of the corresponding known training data sets to first subnetworks, concurrently generate the error values for the first subnetworks, and concurrently modify the first parameter values that define the first subnetworks are performed iteratively until convergence criteria for the first parameter values are satisfied.

19. The computer readable medium of claim 18, wherein the instructions further comprise instructions to manipulate the processor to:

train a second subnetwork based on a cutout training set formed of a subset of known training data sets corresponding to a first subset of the first subnetworks, wherein the first subset encompasses the second subnetwork.

* * * * *